United States Patent
Shin et al.

(10) Patent No.: US 10,218,303 B2
(45) Date of Patent: Feb. 26, 2019

(54) TEMPERATURE CALCULATION SYSTEM FOR A MOTOR USING A THERMAL EQUIVALENT CIRCUIT

(71) Applicants: HYUNDAI MOTOR COMPANY, Seoul (KR); KIA MOTORS CORPORATION, Seoul (KR)

(72) Inventors: YoungJin Shin, Changwon-si (KR); Sanghoon Moon, Yongin-si (KR); WoongChan Chae, Gwangmyeong-si (KR); Hyoungjun Cho, Suwon-si (KR); Jung Shik Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/617,972

(22) Filed: Jun. 8, 2017

(65) Prior Publication Data
US 2018/0167017 A1    Jun. 14, 2018

(30) Foreign Application Priority Data
Dec. 12, 2016 (KR) .......... 10-2016-0168882

(51) Int. Cl.
*H02P 29/60* (2016.01)
*G01K 7/42* (2006.01)

(52) U.S. Cl.
CPC ............... *H02P 29/60* (2016.02); *G01K 7/42* (2013.01)

(58) Field of Classification Search
CPC ....... H01L 2924/00; H01L 2224/48091; H01L 2224/48472; H01L 2924/1305; H01L 2924/13055; H01L 2924/1301; H01L 2224/73265; H01L 2924/00014; H01L 23/36; H01L 23/473; H01L 29/7395; H01L 35/30
USPC ................................ 318/634, 400.08, 788
See application file for complete search history.

(56) References Cited

U.S. PATENT DOCUMENTS

| 5,737,171 A * | 4/1998 | Buller ............. H01L 23/467 257/E23.099 |
| 5,923,135 A * | 7/1999 | Takeda ............ B60L 11/1803 318/432 |
| 5,934,398 A * | 8/1999 | Hotta ................ B60L 3/0023 180/65.31 |
| 5,939,808 A * | 8/1999 | Adames .............. H02K 9/19 310/54 |

(Continued)

FOREIGN PATENT DOCUMENTS

JP        5674524 B2     2/2015
KR     1020060008373     1/2006

(Continued)

*Primary Examiner* — Jorge L Carrasquillo
(74) *Attorney, Agent, or Firm* — Lempia Summerfield Katz LLC

(57) ABSTRACT

A temperature calculation system for a motor uses a thermal equivalent circuit wherein a yoke is disposed to be fixed onto an inner circumferential surface of a housing of the motor, a coolant chamber in which a coolant flows is formed in a circumferential direction in the housing, and the thermal equivalent circuit including thermal resistance coefficients and temperatures is used. An endothermic amount of the coolant flowing in the coolant chamber of the housing is calculated by using an average temperature of the housing and a preset equation.

3 Claims, 9 Drawing Sheets

(56) References Cited

U.S. PATENT DOCUMENTS

| | | | | |
|---|---|---|---|---|
| 6,222,289 B1* | 4/2001 | Adames | ............... | H02K 5/20 310/52 |
| 6,724,313 B2* | 4/2004 | Sato | ............... | H02M 7/00 340/590 |
| 6,759,964 B2* | 7/2004 | Sato | ............... | H02M 7/00 340/590 |
| 7,046,155 B2* | 5/2006 | Sato | ............... | H02M 7/00 257/177 |
| 7,356,441 B2* | 4/2008 | Kerkman | ............... | G01K 7/425 374/E7.043 |
| 7,528,511 B2* | 5/2009 | Smith | ............... | H02K 9/04 310/52 |
| 7,954,334 B2* | 6/2011 | Sasaki | ............... | B60L 3/00 340/584 |
| 8,063,516 B2* | 11/2011 | Ferguson | ............... | H02M 3/33561 307/115 |
| 8,086,420 B2* | 12/2011 | Kerkman | ............... | G01K 7/425 702/182 |
| 8,117,008 B2* | 2/2012 | Kerkman | ............... | G01K 7/425 702/182 |
| 8,319,463 B2* | 11/2012 | Sasaki | ............... | H02M 7/48 318/400.3 |
| 8,482,237 B2* | 7/2013 | Berry | ............... | B60L 3/0061 236/67 |
| 8,926,174 B2* | 1/2015 | Kawamura | ............... | H01L 23/36 374/163 |
| 9,331,554 B2* | 5/2016 | Oh | ............... | H02K 11/21 |
| 9,356,551 B2* | 5/2016 | Berry | ............... | H02P 29/60 |
| 9,496,817 B1* | 11/2016 | Lepka | ............... | H02P 29/60 |
| 2003/0071594 A1* | 4/2003 | Kleinau | ............... | B60L 11/14 318/567 |
| 2003/0076061 A1* | 4/2003 | Kleinau | ............... | B62D 5/0496 318/400.21 |
| 2003/0076064 A1* | 4/2003 | Kleinau | ............... | B62D 5/0481 318/567 |
| 2003/0076065 A1* | 4/2003 | Shafer | ............... | B62D 5/0496 318/567 |
| 2003/0076232 A1* | 4/2003 | Sato | ............... | H02M 7/00 340/679 |
| 2003/0076233 A1* | 4/2003 | Sato | ............... | H02M 7/00 340/679 |
| 2004/0221217 A1* | 11/2004 | Sato | ............... | H02M 7/00 714/745 |
| 2005/0132726 A1* | 6/2005 | Sasaki | ............... | B60L 3/00 62/129 |
| 2007/0073510 A1* | 3/2007 | Kerkman | ............... | G01K 7/425 702/130 |
| 2007/0132446 A1* | 6/2007 | Kleinau | ............... | B60L 15/025 324/160 |
| 2008/0001486 A1* | 1/2008 | Smith | ............... | H02K 9/04 310/52 |
| 2008/0140350 A1* | 6/2008 | Kerkman | ............... | G01K 7/425 702/182 |
| 2008/0140351 A1* | 6/2008 | Kerkman | ............... | G01K 7/425 702/182 |
| 2009/0224715 A1* | 9/2009 | Smith | ............... | H02K 9/04 318/471 |
| 2010/0111134 A1* | 5/2010 | Matsumoto | ............... | H02M 1/32 374/43 |
| 2011/0080124 A1* | 4/2011 | Sasaki | ............... | H02M 7/48 318/400.3 |
| 2012/0007532 A1* | 1/2012 | Baglino | ............... | B60L 3/0061 318/473 |
| 2012/0183247 A1* | 7/2012 | Chamberlin | ............... | H02K 11/25 384/448 |
| 2012/0226483 A1* | 9/2012 | Berry | ............... | B60L 3/0061 703/2 |
| 2013/0110449 A1* | 5/2013 | Cheng | ............... | H02H 6/005 702/132 |
| 2013/0135906 A1* | 5/2013 | Kawamura | ............... | H01L 23/36 363/40 |
| 2014/0210392 A1* | 7/2014 | Berry | ............... | H02P 31/00 318/473 |
| 2015/0008858 A1* | 1/2015 | Oh | ............... | H02K 11/21 318/490 |
| 2015/0198675 A1* | 7/2015 | Hebiguchi | ............... | G01R 31/3662 324/430 |
| 2015/0323396 A1* | 11/2015 | West | ............... | G01K 1/16 374/134 |
| 2016/0315558 A1* | 10/2016 | Lee | ............... | H02M 7/537 |
| 2016/0355067 A1* | 12/2016 | Barnhart | ............... | F25B 21/04 |
| 2016/0356655 A1* | 12/2016 | Tsurumaru | ............... | H01L 29/7395 |
| 2017/0020034 A1* | 1/2017 | Kondo | ............... | H05K 5/0017 |

FOREIGN PATENT DOCUMENTS

| | | |
|---|---|---|
| KR | 1020130133939 | 12/2013 |
| KR | 101394546 | 5/2014 |
| KR | 1020160050924 | 5/2016 |

* cited by examiner

FIG. 5

| CLASSIFICATION | THERMAL SYSTEM | ELECTRIC SYSTEM |
|---|---|---|
| Potential | $\Delta T$ | V |
| Flow | Q' | I |
| Resistance | R | R |
| Capacitance | C | C |
| Law | $Q' = \Delta T/R$ | $I = V/R$ |

TEMPERATURE CALCULATION SYSTEM FOR A MOTOR USING A THERMAL EQUIVALENT CIRCUIT

CROSS-REFERENCE TO RELATED APPLICATION

This application claims priority to and the benefit of Korean Patent Application No. 10-2016-0168882 filed in the Korean Intellectual Property Office on Dec. 12, 2016, the entire contents of which are incorporated herein by reference.

BACKGROUND (a) Field of the Disclosure

The present disclosure relates to a temperature calculation system for a motor.

(b) Description of the Related Art

Among electronic devices, an interior permanent magnet synchronous motor (IPMSM) will be described by way of example, and may be referred to as a motor.

Since the IPMSM simultaneously has a magnetic torque component caused by a permanent magnet and an armature current and has a reluctance torque component caused by a d-q axis inductance difference, it may obtain high torque per unit volume.

However, according to drive characteristics of the IPMSM, excessive iron loss occurs in a high speed region, and since a large input current is required to control a high output, copper loss occurs. Such occurrences in a thermal source cause a disadvantage of raising a temperature of the motor. Increased temperature of the motor adversely affects not only a lifespan of the motor but also characteristics of a rare earth based permanent magnet having demagnetization characteristics at a high temperature.

Accordingly, when the motor is designed, temperature characteristics of the motor should be first considered.

To this end, various thermal analysis technologies, such as a thermal equivalent circuit network method utilizing a lumped parameter method, a distributed parameter method using a finite element method and a finite difference method, and the like have been suggested.

Among these, in order to calculate thermal performance of the motor, the finite element method and the finite difference method are generally used.

However, thermal analysis using the finite element method and the finite difference method may take a long time as a result of having to divide the elements and calculate a matrix to analyze a complex region.

In other words, there is a problem that it is difficult to apply to an entire region of a shape of the motor.

The above information disclosed in this Background section is only to enhance understanding of the background of the disclosure and therefore it may contain information that does not form the prior art that is already known in this country to a person of ordinary skill in the art.

SUMMARY

In view of the foregoing, a method is required whereby a thermal analysis is relatively simple and an entire temperature distribution at various portions of the motor may be easily confirmed, as compared to the distributed parameter method. The present disclosure has been made in an effort to provide a temperature calculation system for a motor using a thermal equivalent circuit configuring an optimal element in consideration of convection and conduction phenomena. The method has the advantages of shortening a thermal analysis time and being also applied to various analysis conditions, as compared to a conventional thermal analysis method. The temperature calculation system uses a thermal equivalent circuit that may calculate a temperature of each of the components according to a driving condition of a driving motor used for a vehicle and may protect the components according to a temperature of the driving motor.

An embodiment of the present disclosure provides a temperature calculation system for a motor using a thermal equivalent circuit. In the system, a yoke is disposed to be fixed onto an inner circumferential surface of a housing forming an appearance of the motor. A coolant chamber in which a coolant flows is formed in a circumferential direction in the housing. The thermal equivalent circuit including thermal resistance coefficients and temperatures is used, and an amount of heat absorbed by the coolant in an endothermic reaction, i.e., and endothermic amount of the coolant flowing in the coolant chamber of the housing is calculated by using an average temperature of the housing and a preset equation.

A temperature of an inner one side of the housing may be calculated by using a temperature of an outer circumferential surface of the yoke, a contact thermal resistance between the housing and the yoke, and a conduction resistance of the housing, and by using a temperature of air outside the housing, convection resistance, and conduction resistance of the housing. The average temperature of the housing may be calculated by using the temperature of the inner one side of the housing and the compensation resistance.

The endothermic amount of the coolant may be converted into a current value, and the current value may be used as a factor for controlling power input to the motor.

The preset equation may be configured to calculate the endothermic amount by using the mass flow rate of the coolant flowing in the coolant chamber, the specific heat of the coolant, an inflow temperature of the coolant, the average temperature of the housing, a convection coefficient of the coolant, and a contact surface area of the coolant.

The preset equation may include—Mass Flow Rate*Specific Heat of Coolant*(Average Temperature of Housing−Inflow Temperature of Coolant)*(exp(−Convection Coefficient*Surface Area/(Mass Flow Rate*Specific Heat of Coolant))−1).

The thermal equivalent circuit may be used to calculate the temperature of the inner one side of the housing and to calculate the average temperature of the housing.

The temperature of the outer circumferential surface of the yoke, the contact thermal resistance between the housing and the yoke, the conduction resistance of the housing, the temperature of the air outside the housing, the convection resistance, and the conduction resistance of the housing may be preset values.

The compensation resistance, the temperature of the end surface of the housing, and the axial conduction resistance of the housing may be preset values.

Power input to the motor may be controlled by the endothermic amount.

According to an embodiment of the present disclosure, it is possible to calculate the temperature of the motor (or an electronic device) within a relatively short time, when the thermal analysis of the motor (or the electronic device) is performed, by providing the temperature calculation method for the motor, calculating the temperature of each component according to input power and according to conduction and convection characteristics using the thermal equivalent circuit formed according to the components.

Further, it is possible to quickly calculate the endothermic amount of the coolant flowing in the coolant chamber formed in the housing of the motor using the thermal equivalent circuit, and to effectively control the current input to the motor.

BRIEF DESCRIPTION OF THE DRAWINGS

FIG. 5 is a Table comparing a thermal system and an electric system according to an embodiment of the present disclosure.

DETAILED DESCRIPTION OF THE EMBODIMENTS

Figure 1:
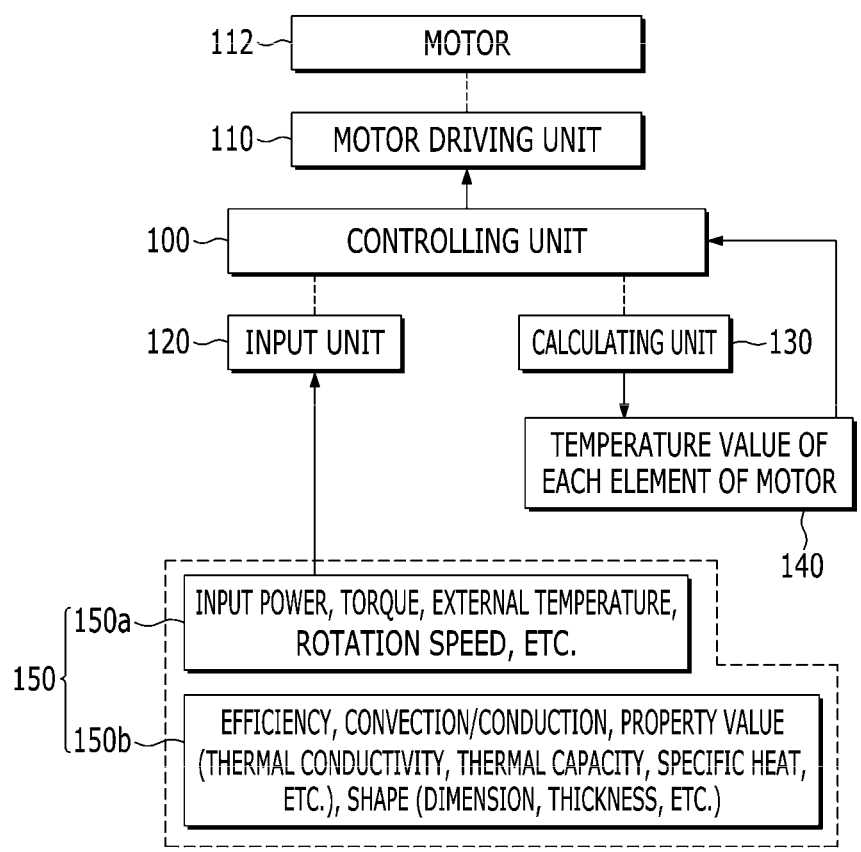
FIG. 1 is a schematic block diagram of a temperature calculation system for a motor using a thermal equivalent circuit according to an embodiment of the present disclosure.

Hereinafter, embodiments of the present disclosure are described in detail with reference to the accompanying drawings.

Sizes and thicknesses of the respective components shown in the drawings are arbitrarily shown for the convenience of explanation. The present disclosure is not necessarily limited to those shown in the drawings, and thicknesses of several parts and regions may be exaggerated for clarity.

The drawings and description are to be regarded as illustrative in nature and not restrictive. Like reference numerals designate like elements throughout the specification.

In the following detailed description, classifying names of the configurations into first, second, third, and the like, is to classify the configurations because the configurations have the same name, and the present disclosure is not necessarily limited to the above-mentioned order in the following detailed description.

FIG. 1 is a schematic block diagram of a temperature calculation system for a motor using a thermal equivalent circuit according to an embodiment of the present disclosure.

Referring to FIG. 1, a temperature calculation system for a motor includes a motor 112, a motor driving unit 110, a controlling unit 100, a input unit 120, and a calculating unit 130. An input value 150 input to the input unit 120 includes a real time input value 150a and a set input value 150b, which is preset. In addition, a temperature value 140 calculated by the calculating unit 130 includes a temperature value of each element of the motor.

The real time input value 150a includes input power, torque, external temperature, rotation speed, and the like. The set input value 150b includes property values such as efficiency, convection/conduction characteristics, thermal conductivity, thermal capacity, and specific heat, and includes a shape including a thickness and a dimension.

The controlling unit 100 may calculate a temperature of the heating part among the elements of the motor using input data. The controlling unit 100 may also calculate a temperature of each of the elements using a convection thermal equivalent circuit or a conduction thermal equivalent circuit between the elements. When it is determined that the calculated temperature exceeds a set value, the controlling unit 100 may control the motor driving unit 110 to control the input power or the rotation speed input to the motor 112.

Further, when it is determined that the calculated temperature exceeds the set value, the controlling unit 100 may generate an overheat signal, and may control a display unit (not shown) displaying an overheated state so that a user may confirm the overheated state.

The controlling unit 100 may be implemented by one or more microprocessors operated by a set program. The set program may include a series of instructions for performing a method according to an embodiment of the present disclosure, as is described below.

Figure 2:
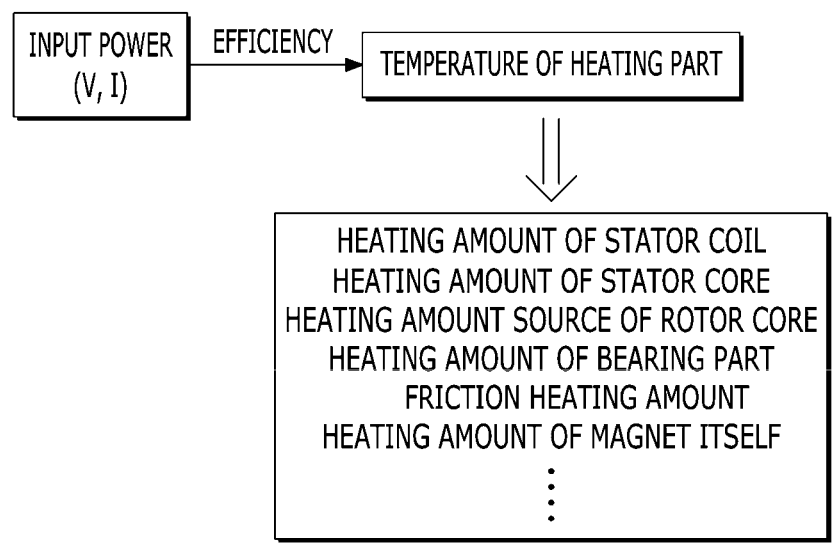
FIG. 2 is a schematic block diagram illustrating elements of a heating part according to input power and efficiency according to an embodiment of the present disclosure.

FIG. 2 is a schematic block diagram illustrating elements of a heating part according to input power and efficiency according to an embodiment of the present disclosure.

Referring to FIG. 2, the input power is input in real time and the temperature of the heating part is calculated according to the efficiency of the motor 112. The heating part may include a coil of a stator, a core of the stator, a core of a rotor, a bearing part, a friction part, and a magnet of the rotor.

Further, according to an embodiment of the present disclosure, the rotation speed of the motor 112 together with the input power may be input. A temperature of the friction part and a temperature of the bearing part may be calculated by the rotation speed of the motor.

Figure 3:
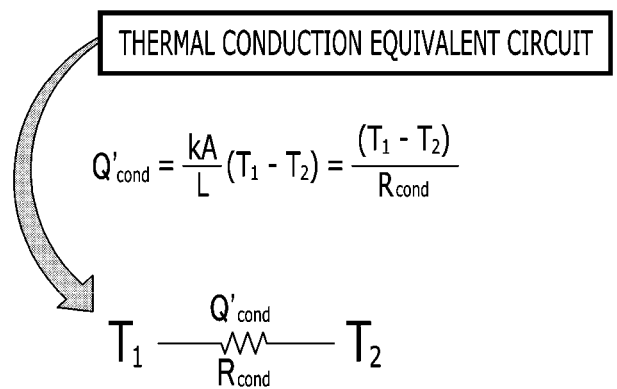
FIG. 3 is an equation illustrating a conduction thermal equivalent circuit according to an embodiment of the present disclosure.

FIG. 3 is an equation illustrating a conduction thermal equivalent circuit according to an embodiment of the present disclosure.

Referring to FIG. 3, the conduction thermal equivalent circuit (or a thermal conduction equivalent circuit) may be represented by a temperature difference (T1−T2), thermal resistance Rcond, and thermal conductivity Q'cond between the respective elements.

Therefore, when the thermal resistance, the thermal conductivity, and T1 are input, T2 may be calculated. Alternatively, when the thermal resistance, the thermal conductivity, and T2 are input, T1 may be calculated.

Figure 4:
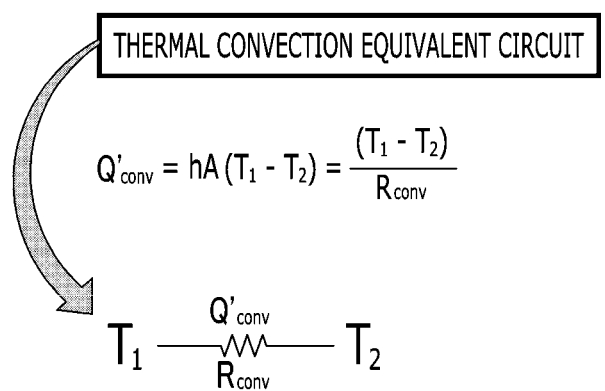
FIG. 4 is an equation illustrating a convection thermal equivalent circuit according to an embodiment of the present disclosure.

FIG. 4 is an equation illustrating a convection thermal equivalent circuit according to an embodiment of the present disclosure.

Referring to FIG. 4, the convection thermal equivalent circuit (or a thermal convection equivalent circuit) may be represented by a temperature difference (T1−T2), thermal resistance Rconv, and a thermal convection rate Q'conv between the respective elements.

Therefore, when the thermal resistance, the thermal convection rate, and T1 are input, T2 may be calculated. Alternatively, when the thermal resistance, the thermal convection rate, and T2 are input, T1 may be calculated.

FIG. 5 is a Table comparing a thermal system and an electric system according to an embodiment of the present disclosure.

Referring to FIG. 5, in the thermal system, a thermal equation is formed by a temperature difference (ΔT), thermal conductivity (convection rate) (Q'), resistance (R), and thermal capacity (C). In the electric system, a thermal equation is formed by voltage (V), current (I), resistance (R), and capacitance (C).

According to the present disclosure, it is possible to shorten the calculation time by analyzing the thermal system of the motor 112 on the same principle as the electric system. It is further possible to prevent thermal failure of the motor 112 in advance and to improve durability thereof by deriving the temperature of each of the elements of the motor in almost real time.

Figure 6:
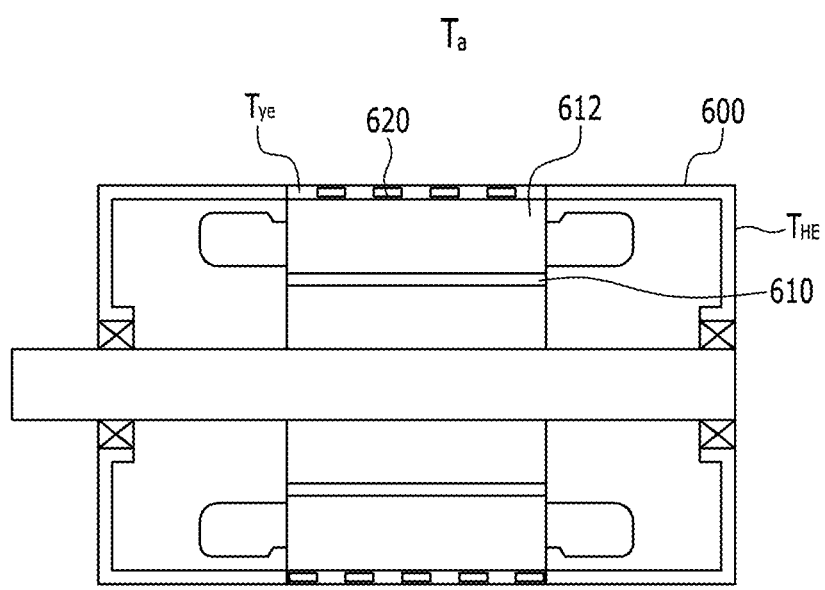
FIG. 6 is a partial cross-sectional view of a motor according to an embodiment of the present disclosure.

FIG. 6 is a partial cross-sectional view of a motor according to an embodiment of the present disclosure.

Referring to FIG. 6, the motor includes a housing 600, a coolant chamber 620, a yoke 612, and teeth 610. A slot (not shown), around which the coil is wound, is formed between the teeth 610.

The yoke 612 is fixed onto an inner circumferential surface of the housing 600. The teeth 610 are formed on an inner circumferential surface of the yoke 612 and are arranged having a set interval. In addition, an outer circumferential surface of the housing 600 is in contact with the surrounding air. The coolant chamber 620, in which the coolant flows, is formed in the housing 600.

According to an embodiment of the present disclosure, the coolant chamber 620 is continuously formed in a circumferential direction of the housing 600. The coolant chamber 620 has a structure in which the coolant continuously flows.

Figure 7:
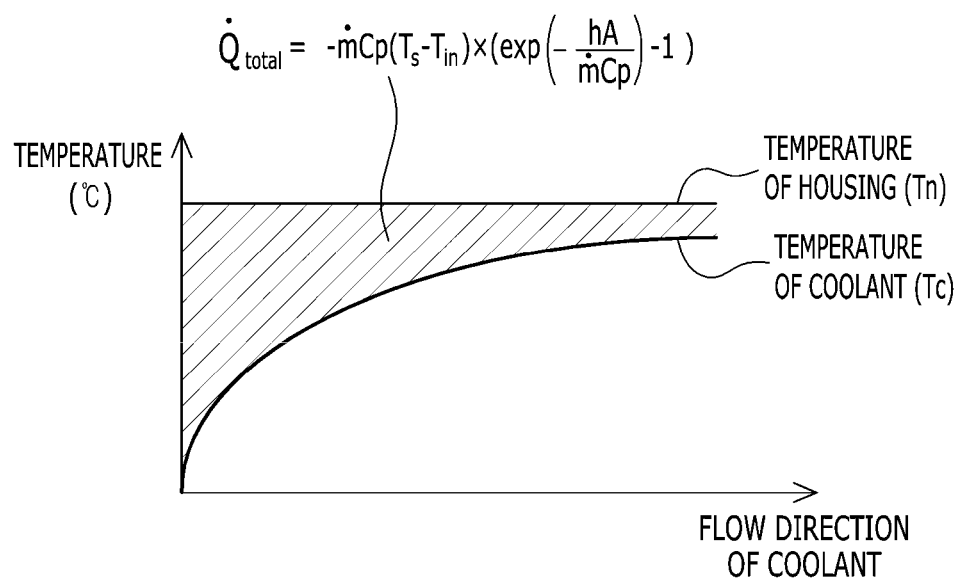
FIG. 7 is a graphical illustration of an endothermic amount and an equation according to a temperature change of a coolant according to an embodiment of the present disclosure.

FIG. 7 illustrates an endothermic amount and an equation according to a temperature change of a coolant according to an embodiment of the present disclosure.

Referring to FIG. 7, a horizontal axis represents a flow distance of the coolant, and a vertical axis represents a temperature of the coolant and a temperature of the housing. There are characteristics depicted such that the temperature Tn of the housing 600 is constant, and the temperature Tc of the coolant is gradually increased over the flow distance.

According to an embodiment of the present disclosure, the endothermic amount, i.e., the amount of heat absorbed by the coolant from the housing 600 may be calculated by the mass flow rate of the coolant, an average temperature of the housing, an inflow temperature of the coolant, a convection coefficient of the coolant, and a thermal transfer surface area of the coolant.

More specifically, referring to FIG. 7, it may be expressed as Endothermic Amount=−Mass Flow Rate of Coolant*Specific Heat of Coolant*(Average Temperature of Housing−Inflow Temperature of Coolant)*(exp(−Convection Coefficient*Thermal Transfer Surface Area/(Mass Flow Rate*Specific Heat))−1).

Figure 8:
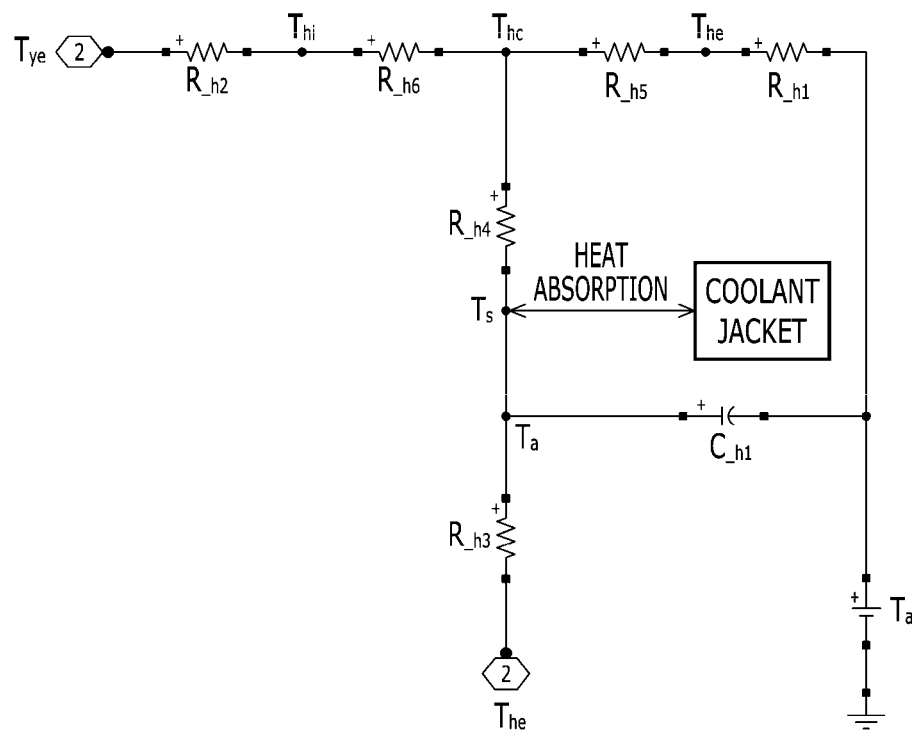
FIG. 8 is a thermal equivalent circuit of a motor according to an embodiment of the present disclosure.

FIG. 8 is a thermal equivalent circuit of the motor according to an embodiment of the present disclosure.

Referring to FIG. 8, the average temperature Ts of the housing 600 is calculated by using a temperature 'Tye' of the outer circumferential surface of the yoke 612, contact thermal resistance R_h2 between the yoke 612 and the housing 600, conduction resistance R_h6 of the housing 600, a temperature Ta of air disposed outside the housing 600, convection resistance R_h1, conduction resistance R_h5 of the housing 600, and compensation resistance R_h4.

Further, a temperature 'The' of an end surface of the housing 600 is calculated by using axial conduction resistance R_h3.

The temperature of the outer circumferential surface of the yoke 612, the contact thermal resistance, the conduction resistance, the temperature of air, the convection resistance, the temperature of the end surface, and the compensation resistance may be preset.

When the average temperature Ts of the housing 600, as calculated above, is input to the equation of FIG. 7, the endothermic amount absorbed by the coolant may be calculated, the endothermic amount may be converted into a current value, and power input to the motor may be controlled by the current value.

In other words, when the endothermic amount is large, the current value is increased. As the current value is increased, it is determined that a heating amount is large, by which the power input to the motor may be reduced.

Figure 9:
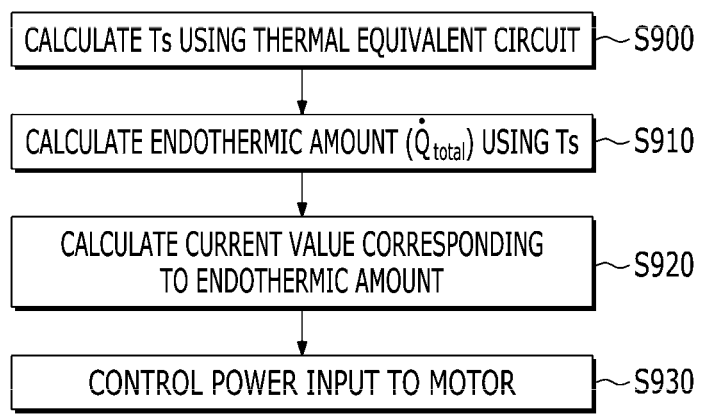
FIG. 9 is a flowchart illustrating a method for calculating an endothermic amount of a coolant using a thermal equivalent circuit according to an embodiment of the present disclosure.

FIG. 9 is a flowchart illustrating a method for calculating an endothermic amount of a coolant using a thermal equivalent circuit according to an embodiment of the present disclosure.

Referring to FIG. 9, in S900, the average temperature Ts of the housing 600 is calculated by using a thermal equivalent circuit. In S910, the endothermic amount is calculated by inputting the average temperature of the housing 600 to a preset equation.

In addition, in S920, a current value corresponding to the endothermic amount is calculated. In S930, the power input to the motor 112 may be controlled by using the calculated current value. In other words, when it is determined that the endothermic amount is a set value or more, it is determined that the motor is overheated, and the input power may be reduced.

While this disclosure has been described in connection with what are presently considered to be practical embodiments, it is to be understood that the disclosure is not limited to the disclosed embodiments. On the contrary, the disclosure is intended to cover various modifications and equivalent arrangements included within the spirit and scope of the appended claims.

What is claimed is:

1. A temperature calculation system for a motor using a thermal equivalent circuit, wherein a yoke is disposed to be fixed onto an inner circumferential surface of a housing of the motor, a coolant chamber in which a coolant flows is formed in a circumferential direction in the housing, and the thermal equivalent circuit, which includes thermal resistance coefficients and temperatures, is used, and an endothermic amount of the coolant flowing in the coolant chamber of the housing is calculated by using an average temperature of the housing and a preset equation, wherein a temperature of an inner one side of the housing is calculated by using a temperature of an outer circumferential surface of the yoke, a contact thermal resistance between the housing and the yoke, and a conduction resistance of the housing, and by using a temperature of air outside the housing, a convection resistance, and the conduction resistance of the housing, wherein the average temperature of the housing is calculated by using the temperature of the inner one side of the housing and a compensation resistance, wherein the preset equation is configured to calculate the endothermic amount by using a mass flow rate of the coolant flowing in the coolant chamber, a specific heat of the coolant, an inflow temperature of the coolant, the average temperature of the housing, a convection coefficient of the coolant, and a contact surface area of the coolant, wherein power input to the motor is controlled by the endothermic amount, wherein the endothermic amount of the coolant is converted into a current value, and the current value is used as a factor for controlling power input to the motor, wherein the thermal equivalent circuit is used to calculate the temperature of the inner one side of the housing and to calculate the average temperature of the housing, and wherein the preset equation includes Mass Flow Rate×Specific Heat of Coolant×(Average Temperature of Housing−Inflow Temperature of Coolant)×(exp $\left(-\dfrac{\text{Convection Coefficient} \times \text{Surface Area}}{\text{Mass Flow Rate} \times \text{Specific Heat of Coolant}}\right) - 1$).

2. The temperature calculation system of claim 1, wherein:

the temperature of the outer circumferential surface of the yoke, the contact thermal resistance between the housing and the yoke, the temperature of the air outside the housing, the convection resistance, and the conduction resistance of the housing are preset values.

3. The temperature calculation system of claim 1, wherein:

the compensation resistance, the temperature of the end surface of the housing, and the axial conduction resistance of the housing are preset values.

* * * * *

UNITED STATES PATENT AND TRADEMARK OFFICE
CERTIFICATE OF CORRECTION

PATENT NO. : 10,218,303 B2
APPLICATION NO. : 15/617972
DATED : February 26, 2019
INVENTOR(S) : YoungJin Shin et al.

It is certified that error appears in the above-identified patent and that said Letters Patent is hereby corrected as shown below:

On the Title Page

On the second page:
Item (56) References Cited, section Foreign Patent Documents, Korean reference number: "101394546" should be replaced with --101394548--.

Signed and Sealed this
Twenty-third Day of April, 2019

Andrei Iancu
*Director of the United States Patent and Trademark Office*